A. R. Blasse,
Egg-Beater.

N° 52,518.    Patented Feb. 13, 1866.

Witnesses.    Inventor.

United States Patent Office.

ALFRIED ROBERT BLASSE, OF WESTMINSTER, MARYLAND.

EGG-BEATER.

Specification forming part of Letters Patent No. 52,518, dated February 13, 1866.

*To all whom it may concern:*

Be it known that I, ALFRIED ROBERT BLASSE, of Westminster, in the county of Carroll and State of Maryland, have made a new and useful Improvement in Egg-Beaters; and I do hereby declare the following to be a full, clear, and exact description of the nature, construction, and operation of the same, reference being had to the accompanying drawings, which are made part of this specification, in which—

Figure 1:
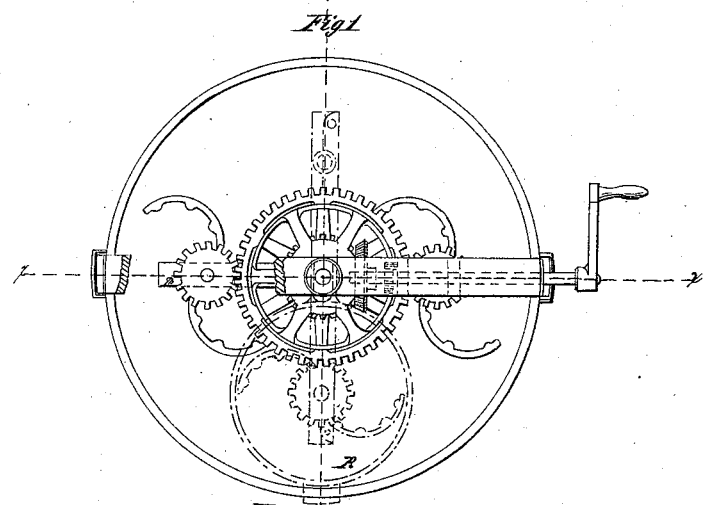
Figure 2:
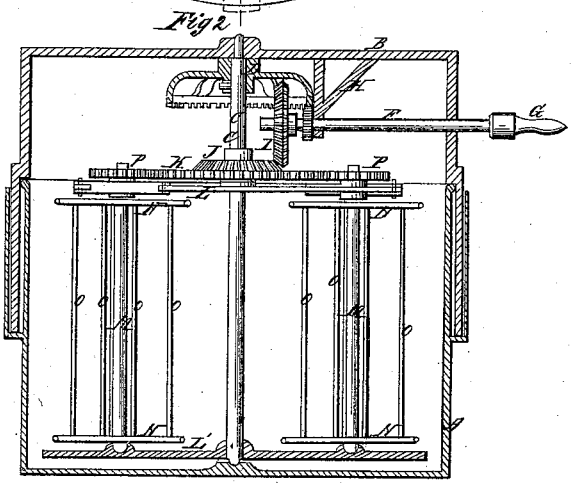
Figure 3:
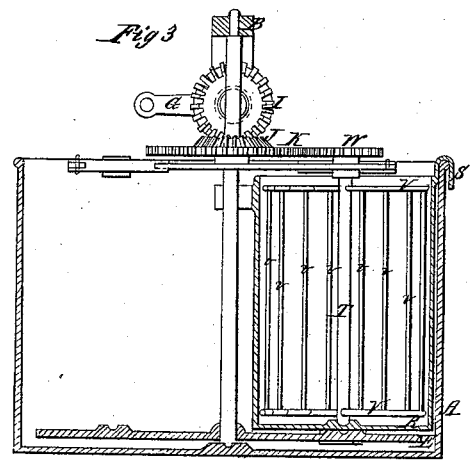

Figure 1 is a top view of the apparatus. Fig. 2 is a central vertical section of the same on the line $x\ x$, Fig. 1. Fig. 3 is a central vertical section of the apparatus arranged with a smaller sectional compartment for operation upon a smaller quantity of material.

The improvement consists of a planetary arrangement of rotating beaters, so arranged as to revolve with the frame in which they are journaled, and also to rotate upon their vertical axes, presenting to the albuminous material concave surfaces, which alternately receive it and dash it back again, the wires or reticulated surfaces cutting through and separating the particles, so as to destroy the normal condition and cause the matter to assume the appearance and quality required for culinary purposes.

In the drawings, A is a vessel, and B a frame or bridge erected over it, the posts occupying sockets in the sides of the vessel, and being removable therefrom, as required. Journaled in the bottom of the vessel and in the frame, respectively, is a vertical shaft, C, upon which upper end is fastened a wheel, D, which is rotated by the pinion E, the shaft F, and the handle G. The shaft F is journaled in the bridge-piece B, and a hanger, H, depending therefrom.

On the end of the shaft F is a bevel-wheel, I, which engages with a similar wheel, J, which latter, in company with the spur-wheel K, is attached to a sleeve or collar, which runs freely on the upright shaft C, while the horizontal arms L L' are attached to the shaft C and revolve with it.

The arms L L' afford journal-bearings for the upright shafts M M, which, in turn, have secondary horizontal arms N N, which latter are connected by the upright wires O O O, &c., and the shafts M M are rotated by means of spur-wheels P P, which engage with the wheel K on the central vertical shaft C.

The arms N N, as will be seen in Fig. 1, are so curved as to present a convexity to the material—eggs, for instance—and although the rotating frame, consisting of the portions N O, is but a skeleton, yet it projects the material across to be arrested by the convex frame opposite, and so, bandied from one to the other and divided by the passage of the wires O between its particles, the eggs are brought into the required condition.

The revolution of the handle G and shaft F, by means of the gearing E D, rotates the whole frame, consisting of the shaft C and arms L L', the frames M N O having a revolving motion around the central shaft. In addition to this the frames M N O, having a rotary motion on their axes by means of their gearing P P K and bevel-wheels J I, the latter being attached to the shaft F.

When it is desired to operate upon a smaller quantity of material—say a small number of eggs—a cylindrical vessel, R, which, with its immediate appurtenances, is shown in blue lines in Fig. 1, and is the subject of Fig. 3, is inserted into the larger vessel and by the arm L'.

When the vessel R is erected a shaft, T, whose lower end enters a socket on the floor of the said chamber and its upper end journaled in the arm L. This shaft is provided with the same arrangement, as before described, of arms U and wires V, which are revolved, by means of the gearing W K, on the rotation of the handle G, as before.

The difference between the two arrangements is this: In the main arrangement the two planetary beaters have a rotation on their axes and a revolution around the central shaft, C, in the larger vessel; and in the more contracted arrangement but one revolving beater rotates in a smaller vessel inside of the larger, revolution around the central shaft, C, being dispensed with.

Having described my invention, what I claim therein as new, and desire to secure by Letters Patent, is—

The combination, in the vessel A, of the smaller vessel R and its rotating beater with the planetary system of revolving beaters, the whole being arranged and operating substantially as described and represented.

The above specification of my improvements in egg-beaters signed this 1st day of December, 1865.

ALFRIED ROBERT BLASSE.

Witnesses:
ALEXR. A. C. KLAUCKE,
JAS. L. ERWIN.